United States Patent
Cornils et al.

[11] Patent Number: 5,815,997
[45] Date of Patent: Oct. 6, 1998

[54] GLASS PANE WITH MOUNTING FRAME

[75] Inventors: Gerd Cornils, Merzenich-Girbelsrath; Rolf Kotte, Alsdorf Begau; Heinz Kunert, Köln 41, all of Germany

[73] Assignee: Saint Gobain Vitrage International, Courbevoie, France

[21] Appl. No.: 953,438

[22] Filed: Sep. 29, 1992

[30] Foreign Application Priority Data

Oct. 11, 1991 [DE] Germany .......................... 41 33 662.3

[51] Int. Cl.⁶ ................................................ E06B 3/00
[52] U.S. Cl. ................... 52/208; 52/397; 296/201
[58] Field of Search .................. 52/208, 397.4; 296/93, 201, 96.21, 146.1, 146.15, 84.1

[56]  References Cited

U.S. PATENT DOCUMENTS

| | | | |
|---|---|---|---|
| 3,416,833 | 12/1968 | Griffin | 52/208 |
| 3,742,649 | 7/1973 | Doehnahl | 52/397 X |
| 4,139,234 | 2/1979 | Morgan . | |
| 4,438,609 | 3/1984 | Nielson | 52/208 |
| 4,530,192 | 7/1985 | Ginster | 52/397 |
| 4,581,276 | 4/1986 | Kunert et al. . | |
| 4,753,824 | 6/1988 | Toda et al. . | |
| 4,768,319 | 9/1988 | Derner . | |
| 4,879,853 | 11/1989 | Braendle | 52/208 |
| 4,933,032 | 6/1990 | Kunert . | |
| 4,938,521 | 7/1990 | Kunert | 52/208 X |
| 4,970,102 | 11/1990 | Guillon | 96/93 X |
| 4,986,867 | 1/1991 | Braendle | 52/208 X |
| 5,033,249 | 7/1991 | Scheeren et al. . | |
| 5,057,265 | 10/1991 | Kunert et al. . | |
| 5,062,248 | 11/1991 | Kunert | 52/208 |
| 5,069,012 | 12/1991 | Riederer | 296/93 X |
| 5,085,021 | 2/1992 | Kunert | 52/208 |
| 5,095,669 | 3/1992 | Kunert | 52/208 |
| 5,096,255 | 3/1992 | Leischner | 52/208 X |
| 5,108,526 | 4/1992 | Cornils et al. . | |
| 5,137,323 | 8/1992 | Gross | 52/208 X |
| 5,154,028 | 10/1992 | Hill | 52/208 |
| 5,261,718 | 11/1993 | Ohlenforst | 52/208 X |

FOREIGN PATENT DOCUMENTS

| | | | |
|---|---|---|---|
| 0 076 924 | 4/1983 | European Pat. Off. | B60R 13/06 |
| A-0 083-061 | 7/1983 | European Pat. Off. | B05B 7/16 |
| 0 304 694 A2 | 3/1989 | European Pat. Off. | B60J 1/10 |
| A-0 421 833 | 4/1991 | European Pat. Off. | B60J 1/02 |
| 2 308 457 | 2/1973 | Germany . | |
| 3323006 A1 | 6/1983 | Germany | B60J 1/02 |
| 3419894 A1 | 5/1984 | Germany | C03C 27/04 |
| 41 00 631 A1 | 7/1992 | Germany | B60J 1/00 |
| 1 591 317 | 6/1981 | United Kingdom | B29F 3/10 |
| 2 132 130 | 7/1984 | United Kingdom | B29F 3/10 |

OTHER PUBLICATIONS

Japanese Patent Office, Patent Abstracts of Japan, 8 Juin 1990, vol. 14, No. 266 (M–982) (4209); JP–A–20 76 16 (Toyoda Gosei Co. Ltd.) 16 Mars 1990.

Derwent Publications Ltd., London, GB; AN 90–128279 [17]; JP–A–2 076 716 (Toyoda Gosei) 16 Mars 1990.

*Primary Examiner*—Carl D. Friedman
*Assistant Examiner*—Beth Aubrey
*Attorney, Agent, or Firm*—Pennie & Edmonds LLP

[57]  ABSTRACT

An automobile glazing pane, ready for installation, is pre-equipped with a mounting frame of an elastomer. The mounting frame is disposed only on the side of the glass pane facing towards the fixing flange of the window frame, without engaging around the edge of the glass pane and is bonded to the glass pane. It possesses a mounting groove for the clamped fixing of the pre-equipped glass pane to the fixing flange of the window pane.

15 Claims, 2 Drawing Sheets

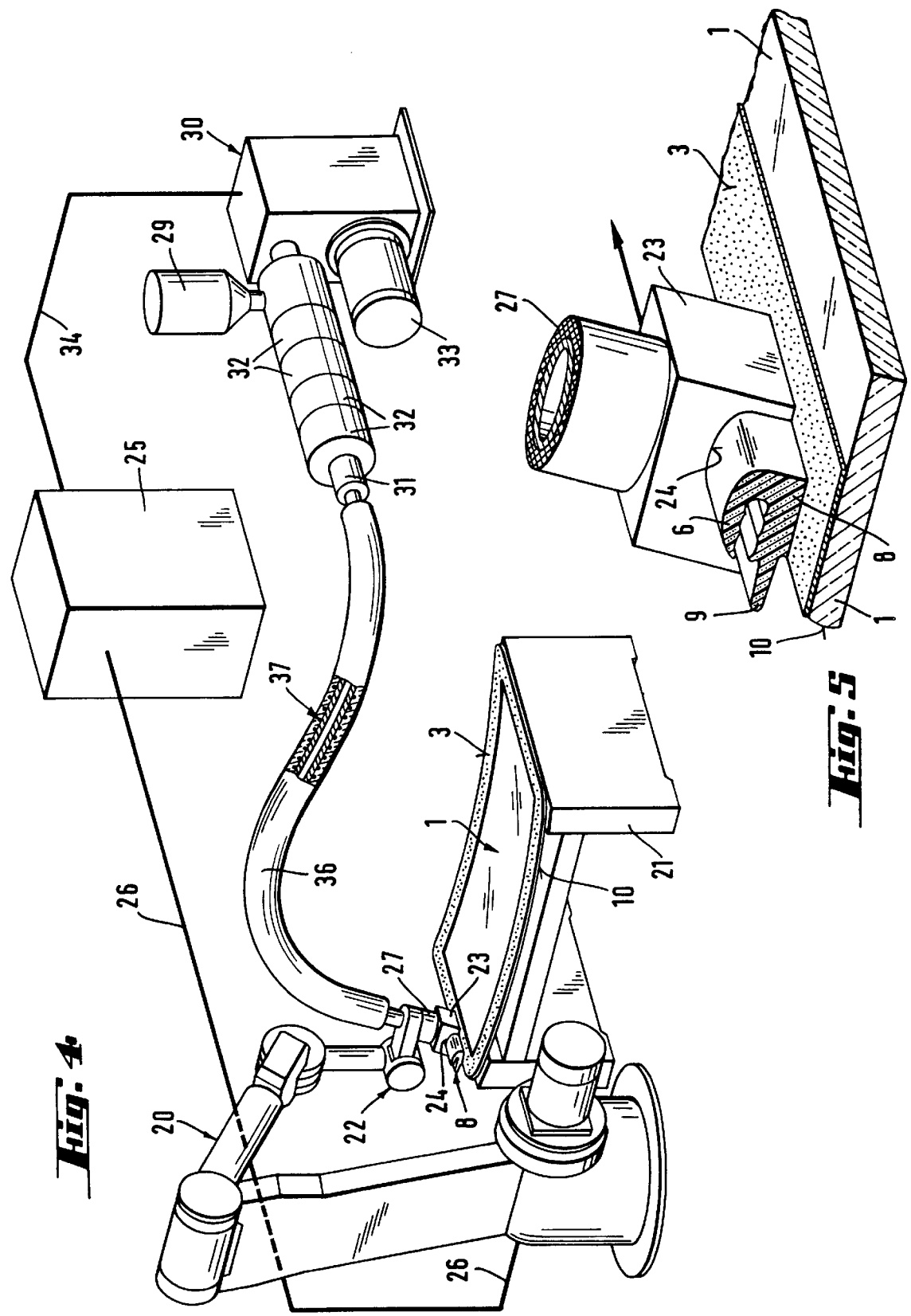

GLASS PANE WITH MOUNTING FRAME

FIELD OF THE INVENTION

This invention concerns a glass pane pre-equipped with a mounting frame of an elastomer, especially a ready-to-install automobile glass pane. It furthermore concerns a method for the production of such a glass pane.

BACKGROUND OF THE INVENTION

The mounting of glass panes in the window frames of an automobile body can be carried out either by the bonding method or by means of a rubber frame. In the bonding method, a strand of adhesive is applied onto the peripheral zone of the glass pane, and by means of this the pane is glued to the fixing flange of the window frame. In installation by means of a rubber frame, a prefabricated rubber frame, which grips the glass pane at the edge on three sides, is pulled onto the edge of the glass pane; this rubber frame, in addition to the holding groove for the glass pane, comprises a mounting groove on the rear side of the pane, by means of which the glass pane, surrounded with the mounting frame, is fixed on the fixing flange of the window frame.

Whereas in the bonding method it is possible to install the glass pane with its outer face flush with the automobile body and in this manner to create highly streamlined bodies, that is bodies having an especially low air resistance, the known rubber frames possess a profiled flange which engages over the outer face of the glass pane, thus making the design of streamlined automobile bodywork difficult. In order to install automobile panes with the outer face flush, one is therefore compelled to adopt the bonding method.

The mounting of automobile glass panes by means of the bonding method is, on the other hand, accompanied by the disadvantage that due to the fixed bonding, the removal of the glass panes is rendered difficult. This disadvantage is not only important when a broken or unusable glass pane is to be replaced by a new one, but also will become increasingly important in the future, when the individual components of automobiles are to be fed to a recycling process when the vehicle is scrapped. In this case, there is a considerable advantage in developing dismantling-friendly designs and methods of installation, which facilitate the breaking down of the vehicle into its individual parts.

SUMMARY OF THE INVENTION

The objective of the present invention is to create a ready-to-install automobile glass pane, which will make possible glazing with a flush outer skin and also will be especially easy to install and dismantle.

According to the invention, this objective is achieved in that the glass pane is pre-equipped with a mounting frame of an elastomer, which is disposed only on the face of the glass pane towards the fixing flange of the window frame, without engaging around the edge of the glass pane, and is bonded to the surface of the glass and which possesses a mounting groove for the clamped fixing of the pre-equipped glass pane on the fixing flange.

A glass pane pre-equipped with such a mounting from according to this invention possesses the advantages of both the usual methods of installation, without being accompanied by their disadvantages. In particular, it is mounting-friendly and removal-friendly like a glass pane provided with a conventional rubber frame, and even has the advantage of better sealing action against penetrating moisture, compared with a glass pane of that type framed in a conventional rubber frame, wherein the rubber frame is pushed onto the edge of the pane. On the other hand, by means of this invention streamlined glazings can be achieved without the bonding method having to be used in the mounting of the glass panes. As a consequence, the measures such a cleaners and primers of the glass surfaces immediately before the application of the strip of mounting adhesive, which are necessary where the bonding method is used, and also expensive means for the mechanical fixing of the glass panes in the window frame until the mounting adhesive has completely hardened, are eliminated. Consequently, an especially advantageous and particularly economical automobile glazing is created by this invention.

For manufacturing the ready-to-install glass pane, according to this invention the mounting frame, of an elastomer that bonds to the glass surface and has a Shore hardness of 55 to 80, is extruded at a high application pressure by means of a suitably profiled extrusion nozzle directly onto the face of the glass pane which will be towards the fixing flange of the window frame, after this glass surface has been appropriately prepared.

It is, indeed, basically possible to select suitable reactive polymer systems for the elastomer, for example, certain two-component polyurethane reaction systems, but thermoplastic elastomer systems can be used for this purpose with greater advantage. Whereas with reactive polymer systems it is difficult to find systems that not only adhere to the glass surface, but in which the extruded profiles, immediately after leaving the extrusion nozzle, already possess such stability that the mounting groove necessary for this invention, which must inevitably be horizontal during extrusion, is retained and does not deform, these problems are more easily overcome in the case of thermoplastic elastomers. With thermoplastic elastomers, it is simpler to carry out the process in such a manner that the extruded material, immediately after leaving the heated extrusion nozzle, hardens sufficiently for the desired cross-sectional profile to maintain its shape.

For the objective of this invention, thermoplastic elastomers on a polyurethane basis have, for instance, proved suitable. Thermoplastic polyolefin elastomers of isotactic polypropylene and ethylene-propylene-diene-rubber, for example the product SANTOPRENE of the firm Monsanto, have also proved particularly suitable. From these products, those types are selected which possess a processing temperature of 180° to 230° Celsius and a Shore hardness of about 60 and also a good bond to the glass surface.

BRIEF DESCRIPTION OF THE DRAWINGS

Further details and advantages of this invention will become apparent from the sub-claims and from the following description of preferred examples of embodiment of the invention, given with reference to the drawings.

FIG. 4 is a perspective view of fittings suitable for carrying out the process according to this invention; and FIG. 5 is a perspective view of the extrusion head of FIG. 4, to a larger scale.

DETAILED DESCRIPTION OF THE INVENTION

Figure 1:
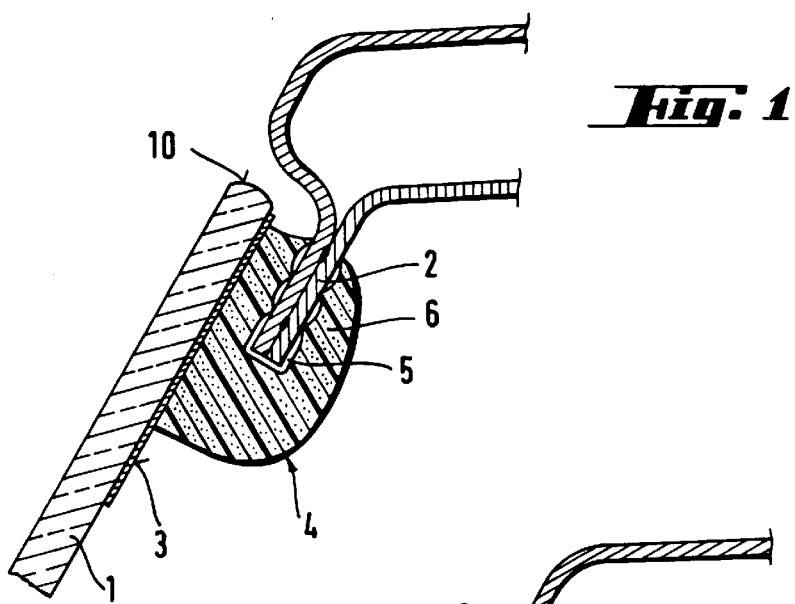
FIG. 1 is a sectional view in the region of the window frame of an automobile window with a glass pane pre-equipped according to this invention.
Figure 2:
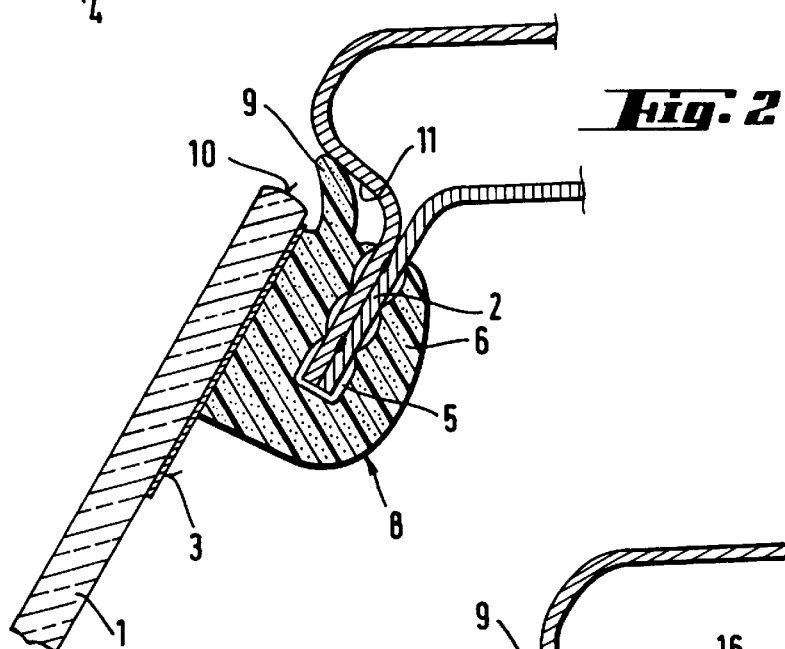
FIG. 2 is a view similar to FIG. 1 of a form of embodiment of a mounting frame according to this invention, having an additional sealing lip.
Figure 3:
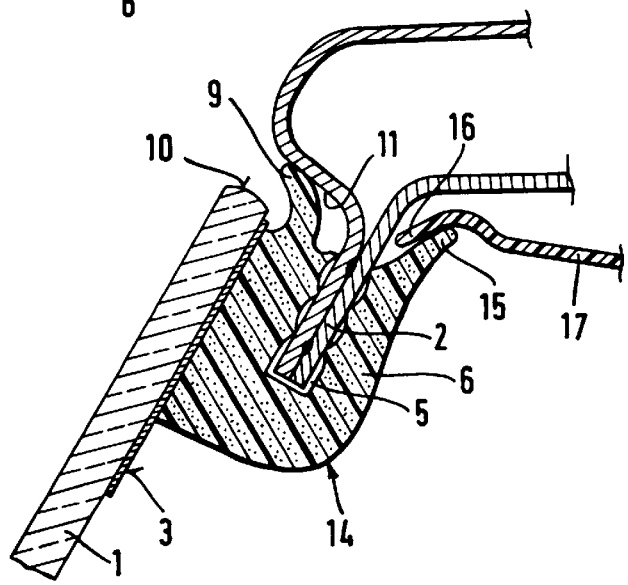
FIG. 3 is a view similar to FIG. 1 of a further form of embodiment of a mounting frame according to this invention.

The various embodiments shown in the drawings each include a monolithic safety glass pane 1, which is pre-equipped with a profiled frame constructed according to this invention and fixed to the fixing flange 2 of the window frame. Instead of monolithic glass panes, however, laminated or innerly plastic coated glass panes, as are commonly employed for windscreens, can of course be pre-equipped with the profiled frame in the same manner and installed. In FIGS. 1 to 3, a vertical section is shown in each case in the upper edge region of the installed glass pane.

On the side of the glass pane 1 towards the vehicle interior, a frame-like coating 3 of an opaque material, preferably of an opaque enamel, is disposed along the edge of the pane. This coating 3 protects the adhesive surface of the mounting frame 4 from the influence of ultraviolet radiation.

The mounting frame 4 is of a rubber-elastic polymer and is firmly and permanently bonded to the glass surface and coating 3 of enamel respectively.

The physical properties and properties in use of the polymer used for the mounting frame should be comparable with the corresponding properties of the conventional mounting frames of ethylene-propylene-diene-rubber (EPDM). In particular, the Shore hardness of the polymer used should be about 55 to 65 Shore A and the mechanical strength properties must satisfy values such that the required clamping forces can be applied by the frame profile onto the fixing flange 2, in order that the glass pane, in accordance with the relevant regulations, shall be reliably held in the window frame even in the case of the impact of a passenger onto the glass pane in the case of a collision. Furthermore, the elastomer used for the mounting frame must possess good resistance to oils and hydrocarbons and a comparatively high temperature stability, the mechanical properties not being substantially modified even at temperatures of up to 100° Celsius. These conditions still further limit the range of materials that can be used for the mounting frame. Thus, for example, the moisture-hardening, single-component polyurethane systems known for the extrusion of profiled frames and profiled strands directly onto the glass pane or the reactive two-component polyurethane systems also known for this purpose cannot be used on account of their too low hardness values. On the other hand, as already mentioned above, various thermoplastic elastomer systems have proved suitable.

To manufacture a glass pane pre-equipped with such a mounting frame economically, an elastomer system is selected which satisfies the aforementioned conditions and which, furthermore, is extrudable in such a manner that the frame profile can be produced by extrusion directly onto the glass pane under a high application pressure and will bond firmly to the glass surface.

The mounting frame 4 has a substantially U-shaped cross-section. The mounting groove 5 thus formed is orientated parallel to the surface of the glass pane and, in the installed state of the glass pane, receives the fixing flange 2 of the window frame. The installation of the thus pre-equipped glass pane is carried out in the known manner in that, before the glass pane is installed, a cord is laid into the mounting groove, by means of which the inner web 6 of the profiled frame is pulled over the fixing flange 2.

The mounting frame 8 illustrated in FIG. 2 differs from the previously described mounting frame 4 in that the profile has an additional sealing lip 9. The sealing lip 9 bears, when the glass pane is installed into the window frame, against the wall 11 of the window frame opposite the peripheral surface 10 of the glass pane and thus covers the gap between this wall 11 and the peripheral surface 10.

In the form of embodiment of the mounting frame 14 illustrated in FIG. 3 also, a sealing lip 9 is provided for closing the gap between the peripheral surface 10 of the glass pane and the wall 11 of the window frame. The mounting frame 14 also possesses, on the inner face, as a continuation of the web 6 a further lip 15. This lip 15, as the glass pane is installed, is also pulled by means of the cord, by which the web 6 of the profile is pulled over the fixing flange 2, over the edge region 16 of the roof lining plate 17 which functions as a cover for the fixing flange 2, thus creating an inconspicuous junction between the roof liner and the window frame.

Since thermoplastic elastomers are preferably extruded directly onto the edge of the glass pane for pre-equipping it with the mounting frame, an installation is illustrated in FIGS. 4 and 5, by means of which this pre-equipping of the glass panes is carried out. The glass pane 1, which is to be provided along its edge with the mounting frame, is provided at the edge on that surface, on which the profiled strand is extruded and laid, with a frame-like coating 3 of an opaque enamel, which for example is baked on during the course of the bending process. The surface of this coating 3 is first carefully cleaned and pretreated with a primer. A suitable primer is a modified two-component polyurethane system in a solvent, which consists of a mixture of trichlorethylene, 1,1,1-trichloroethane and methylene chloride; for example, the product X 8310 of the firm HENKEL and the product AK 290 of the firm KÖMMERLING, have proved especially suitable.

The thus pretreated glass pane is then positioned carefully within the working range of a robot 20 on a table 21.

On the manipulation head 22 of the robot 20, an extrusion nozzle 23 is mounted, which is provided with a calibrated nozzle opening 24 corresponding to the cross-section of the desired mounting frame (FIG. 5). The extrusion nozzle 23 is conducted by the robot 20 along the edge of the glass pane 1 in accordance with the predetermined displacement programme, the robot 20 being controlled from a central control unit 25 via the control line 26. The extrusion nozzle 23 is provided with an electrical heating element 27, by which the nozzle body is heated to the temperature of about 200° Celsius, necessary for the extrusion of the thermoplastic elastomer.

The thermoplastic elastomer to be extruded is fed as granulate into the feed hopper 29 of the screw extruder 30 and is melted in the screw extruder 30 and fed under a high pressure to the extrusion nozzle 23. The cylinder 31 of the screw extruder 30, containing the screw, is surrounded by a plurality of heating rings 32, which by means of electrical heating resistors heat the cylinder 31 together with the screw revolving therein to the required temperature. The drive motor 33 of the screw extruder 30 is controlled, like the robot 20, from the central control unit 25 via the control line 34.

The connection between the cylinder 31 of the extruder 30 and the extrusion nozzle 23 is provided by an electrically heated high-pressure hose 36. The high-pressure hose 36 must be capable of withstanding pressures of at least 250 bar at operating temperature and must possess an electrical heating winding 37, which makes possible controlled heating of the hose 36 to a temperature of about 200° Celsius. On the other hand, the high-pressure hose 36 must be sufficiently flexible for it to be able to follow the movements of the extrusion nozzle 23 without restriction, and not adversely to affect the movements of the robot.

By means of this apparatus, for example, the product SANTOPRENE A type 111–64 of the Monsanto company can be extruded under a high application pressure as a profiled strand 8 onto the edge region of the glass pane, pretreated with the described primer. In the case illustrated here, the profiled strand 8 possesses a sealing lip 9, projecting beyond the peripheral surface 10 of the glass pane 1. When the glass pane is set in the window frame of the automobile body, the sealing lip 9 bends around the peripheral surface 10 of the glass pane 1 and thus fills the gap located between the peripheral surface 10 of the glass pane 1 and the wall 11 of the window frame opposite this peripheral surface 10. Instead of the lip 9, a hose-like hollow profile may also be provided, which then fulfills the same purpose.

We claim:

1. A ready-to-install glass pane having a peripheral edge, especially an automobile glass pane, for mounting in a fixing flange of a window frame having an exterior and interior side, with the glass pane positioned on one side of the fixing flange, comprising:

a mounting frame (4, 8, 14), of an elastomer, bonded to the glass surface only on that side of the glass pane (1) which faces towards the fixing flange (2) of the window frame, without engaging around the peripheral edge (10) of the glass pane, said mounting frame (4) defining a pre-equipped part of said glass pane and including a mounting groove (5) with two directly opposing sides for clamped fixing of the pre-equipped glass pane (1) onto the fixing flange (2); and wherein the mounting frame (8, 14), of an elastomer, includes a sealing lip (9) projecting beyond the peripheral edge (10) of the glass pane (1) at a position between said surface of the glass pane and said mounting groove (5) for sealing engagement with the one side of said fixing flange when the pre-equipped glass pane is clamped on the fixing flange (2).

2. A ready-to-install glass pane having a peripheral edge, especially an automobile glass pane, for mounting in a fixing flange of a window frame having an exterior and interior side, with the glass pane positioned on one side of the fixing flange, comprising:

a mounting frame (4, 8, 14), of an elastomer, bonded to the glass surface only on that side of the glass pane (1) which faces towards the fixing flange (2) of the window frame, without engaging around the peripheral edge (10) of the glass pane, said mounting frame (4) defining a pre-equipped part of said glass pane and including a mounting groove (5) with two directly opposing sides for clamped fixing of the pre-equipped glass pane (1) onto the fixing flange (2); and wherein said one side of said fixing flange is the exterior side thereof, and the mounting frame (14), of an elastomer, includes a projecting lip (15) facing toward the interior side of said frame, with said mounting groove (5) being positioned between said projecting lip (15) and said surface of the glass pane, said projecting lip (15) being spaced from the interior side of said fixing flange when the pre-equipped glass pane is clamped on the fixing flange (2) to define a space for receiving an edge of a cover for said fixing flange.

3. A ready-to-install glass pane having a peripheral edge, especially an automobile glass pane, for mounting in a fixing flange of a window frame having an exterior and interior side, with the glass pane positioned on one side of the fixing flange, comprising:

a mounting frame (4, 8, 14), of an elastomer, bonded to the glass surface only on that side of the glass pane (1) which faces towards the fixing flange (2) of the window frame, without engaging around the peripheral edge (10) of the glass pane, said mounting frame (4) defining a pre-equipped part of said glass pane and including a mounting groove (5) with two directly opposing sides for clamped fixing of the pre-equipped glass pane (1) onto the fixing flange (2); and wherein a cord is positioned in the mounting groove (5) to facilitate the installation operation.

4. A ready-to-install glass pane according to claim 3 wherein said one side of said fixing flange is the exterior side thereof, and the mounting frame (14), of an elastomer, includes a projecting lip (15) facing toward the interior side of said frame, with said mounting groove (5) being positioned between said projecting lip (15) and said surface of the glass pane, said projecting lip (15) being spaced from the interior side of said fixing flange when the pre-equipped glass pane is clamped on the fixing flange (2) to define a space for receiving an edge of a cover for said fixing flange.

5. A ready-to-install glass pane according to claim 2 or 3, wherein the mounting frame (8, 14), of an elastomer, includes a sealing lip (9) projecting beyond the peripheral edge (10) of the glass pane (1) at a position between said surface of the glass plane and said mounting groove (5) for sealing engagement with the one side of said fixing flange when the pre-equipped glass pane is clamped on the fixing flange (2).

6. A ready-to-install glass pane according to any one of claims 1–3, wherein the elastomer of the mounting frame is solidified and hardened and has a Shore A hardness of between about 58 and 62.

7. A ready-to-install glass pane according to any one of claims 1–3, wherein the elastomer of the mounting frame is a thermoplastic elastomer on the basis of a thermoplastic polyurethane system.

8. A ready-to-install glass pane according to any one of claims 1–3, wherein the elastomer of the mounting frame is a thermoplastic polyolefin elastomer of isotactic polypropylene and ethylene-propylene-diene-rubber.

9. A ready-to-install glass pane according to any on of claims 1–3, wherein the elastomer of the mounting frame is an extruded thermoplastic elastomer.

10. A ready-to-install glass pane having a peripheral edge, especially an automobile glass pane, for mounting in a fixing flange of a window frame having an exterior and interior side, with the glass pane positioned on one side of the fixing flange comprising:

a mounting frame (4, 8, 14) of an elastomer bonded to the glass surface only on that side of the glass pane (1) which faces towards the fixing flange (2) of the window frame, without engaging around the peripheral edge (10) of the glass pane, said mounting frame (4) defining a pre-equipped part of said glass pane and including a mounting groove (5) for clamped fixing of the pre-equipped glass pane (1) on the fixing flange (2), wherein the mounting frame (8, 14), of an elastomer, includes a sealing lip (9) projecting beyond the peripheral edge (10) of the glass pane (1) at a position between said surface of the glass pane and said mounting groove (5) for sealing engagement with the one side of said fixing flange when the pre-equipped glass pane is clamped on the fixing flange (2).

11. A ready-to-install glass pane according to claim 10, wherein said one side of said fixing flange is the exterior side thereof, and the mounting frame (14), of an elastomer, includes a projecting lip (15) facing toward the interior side of said frame, with said mounting groove (5) being positioned between said projecting lip (15) and said surface of the glass pane, said projecting lip (15) being spaced from the interior side of said fixing flange when the pre-equipped glass pane is clamped on the fixing flange (2) to define a space for receiving an edge of a cover for said fixing flange.

12. A ready-to-install glass pane according to claim 10 characterized in that a cord is positioned in the mounting groove (5) to facilitate the installation operation.

13. A ready-to-install glass pane according to claim 10, wherein the elastomer of the mounting frame is solidified and hardened and has a Shore A hardness of between about 58 and 62.

14. A ready-to-install glass pane according to claim 10, wherein the elastomer of the mounting frame is a thermoplastic elastomer on the basis of a thermoplastic polyurethane system.

15. A ready-to-install glass pane according to claim 10, wherein the elastomer of the mounting frame is a thermoplastic polyolefin elastomer of isotactic polypropylene and ethylene-propylene-diene-rubber.

\* \* \* \* \*